No. 645,174. Patented Mar. 13, 1900.
J. W. LANE.
THREAD CUTTER.
(Application filed Oct. 31, 1899.)
(No Model.)
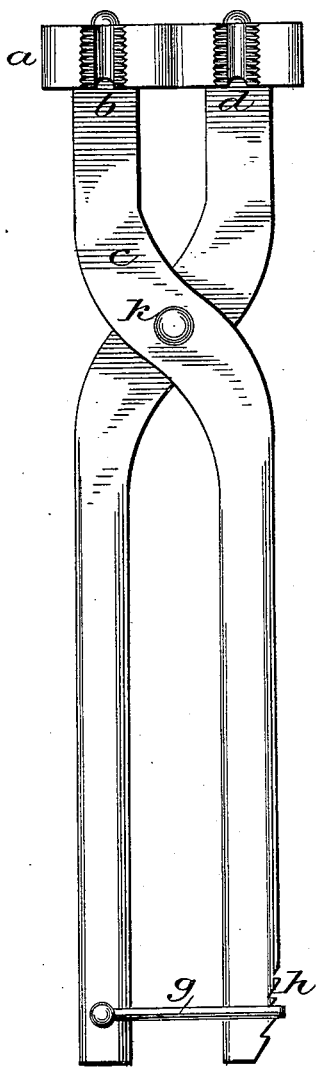
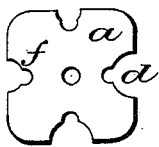
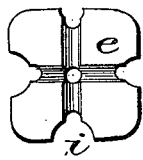
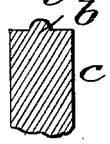
Witnesses:
Nellie E. Stevens
Estes E. Buxton
Inventor:
John W. Lane
THE NORRIS PETERS CO., PHOTO-LITHO., WASHINGTON, D. C.

UNITED STATES PATENT OFFICE.

JOHN W. LANE, OF GUTHRIE, OKLAHOMA TERRITORY.

THREAD-CUTTER.

SPECIFICATION forming part of Letters Patent No. 645,174, dated March 13, 1900.

Application filed October 31, 1899. Serial No. 735,441. (No model.)

*To all whom it may concern:*

Be it known that I, JOHN W. LANE, a citizen of the United States, residing at Guthrie, in the county of Logan and Territory of Oklahoma, have invented a new and useful Thread Cutter and Renewer, of which the following is a specification.

My invention relates to improvements in thread-cutting tools and is a new and independent tool.

My object in the invention of this tool is to cut or renew threads on bolts where screwplates or other dies cannot be used, also where they can be used, and also where the thread on bolts is battered and defaced and in such a condition that a nut cannot be put on.

One great object of this invention is to renew the threads on bolts without removing them from the position they are in—such as bolts in wagon and buggy fellies and tires, axle, spring, and shackle clips, &c.

Figure 1 shows the tool complete and all parts together in working order. Figs. 2 and 3 show a part of the tool with cutting-apertures, said Figs. 2 and 3 being die-blocks and attached to levers, as shown in complete tool, Fig. 1. Fig. 4 is a detail in section.

As is shown by the accompanying drawings, there are two steel dies attached to a "pair of pincers," so to speak. The pincers are to be made of malleable iron fastened together—that is, the handles—by a rivet, (marked K.) The jaws are square or flat on each end, with the exception of a tongue. Upon this jaw and where the tongue is, is placed the die-plate spoken of above. The jaw end and tongue are shown in the drawings and marked 4. The dies are made with a groove made to fit over the tongue on the jaw. The groove side of the die is shown in the drawings marked 3. There are threads cut in each die-plate. On each die-plate are four different sizes of threads. The die-plate is something in the shape of a square, and on each side are cut these threads, and, as stated above, four different sizes are made. The dies are attached in such a way that the same-sized threads rest opposite one another. The bolt is then placed between the jaws or dies, and it is ready for use. The dies are attached to the jaws by a set-screw. There are cut on the under side of die-blocks or the side resting next to jaw of lever two grooves. The grooves are made for the purpose of resting on ribs or tongues made on the jaw of the lever. The grooves are made and adapted to engage the ribs on the ends of said levers to hold the die-blocks in locked registering position. The object of the two grooves in each die-block is for the purpose of so turning the die-blocks that they may be adjusted to cut different-sized bolts.

All that is necessary to turn the die-plate is to remove or loosen the set-screw and turn the die-plate around one-quarter or one-half, whichever size the operator desires to use. The tongue on the end of the jaw is for the purpose of holding the die-plate and takes the strain off the set-screw while in use. There is also a clasp attached on one handle of the pincers by a pivot, (marked *g*.) The clasp is attached near the end of the handle and is fastened to the other handle by being pushed or pressed into the notches (marked *h*) which are cut for the purpose. The clasp is not absolutely necessary in order to give the operator the purchase power required, as there is plenty without using the clasp. It is simply made a part of the tool to suit the taste or whim of the person using it.

I deem it unnecessary to elucidate at length the merit and usefulness of this tool, but will mention a few places where this can be used to a great advantage and where no other thread-cutter can be used. For instance, take a buggy; a party desires to place new nuts upon bolts in different parts of the buggy—say the bolts that are in the fellies—and, in order to place a new nut upon them, in ninety-nine times out of a hundred it becomes necessary to remove the bolt and put a new one in, the old one being worn and battered on the nut end and in such a way as to render it impossible to place a nut upon it. By the use of this tool one can simply remove the nut, cut a thread, and place a nut upon it without removing the bolt and can even use it between spokes or other parts of the buggy, where no other tool in existence can be used. The thread can be cut from the end, working toward the head end of the bolt as a nut would be worked or turned on. Where the end of the bolt is battered and the thread smooth or imperfect, one can place the die-plates over in any of the perfect threads, and work them backward as a nut would be turned off, and thus renew without cutting the entire bolt anew. Not only will it save in renewing bolts without removing them from the part or parts they are in, but it will also save expense, for the reason that one will not need to purchase new bolts, but can use the old ones.

As one example that this tool will save in expense and labor I refer to the convenience and usefulness it would be to a mechanic in resetting tires. Every bolt in a wheel that holds the tire has to be taken out, and almost every one of them will be battered and defaced on the nut end, thus making it impossible to place another nut upon the old bolt without recutting the threads, and also rendering it necessary to use new bolts, thus increasing the expense and cost of resetting tires. By the use of this tool one can use the old bolts until entirely worn out.

What I claim as my invention, and desire to secure by Letters Patent, is—

A thread-cutter comprising two levers pivoted together, a locking-clasp pivoted to the end of one arm and engaging the adjacent end of the other arm; rotatable die-blocks adjustably pivoted on the opposite adjacent ends of said levers, said die-blocks having corresponding halves of screw-cutting apertures in their peripheries adapted to register and grooves on their under sides adapted to engage ribs on the ends of said levers to hold the die-blocks in locked registering position.

In testimony whereof I have signed my name to this specification in the presence of two subscribing witnesses.

JOHN W. LANE.

Witnesses:
THOMAS F. McKENNON,
WILLIAM CAHALAN.